United States Patent [19]
Stephenson

[11] 3,792,727
[45] Feb. 19, 1974

[54] AUTOMOTIVE OIL COOLER

[75] Inventor: Francis V. Stephenson, Arvada, Colo.

[73] Assignee: Integrity Transcool Incorporated, Arvada, Colo.

[22] Filed: Apr. 19, 1972

[21] Appl. No.: 245,519

[52] U.S. Cl. .................................. 165/44, 165/172
[51] Int. Cl. .............................................. B60h 3/00
[58] Field of Search .... 165/44, 23, 41, 47, 157, 172

[56] References Cited
UNITED STATES PATENTS
2,139,367   12/1938   Kearney ................................ 165/44
2,382,218   8/1945   Fernstrum ............................. 165/44

Primary Examiner—Charles Sukalo
Attorney, Agent, or Firm—John E. Reilly

[57] ABSTRACT

An oil cooler for attachment to a transmission of an automotive vehicle includes a pan with means for attaching the pan to the transmission whereby oil will be continually cooled and retained for use in the pan. The pan includes a single row of tubular members which pass through the pan and have open ends disposed exteriorly of the pan. The tubular members are exposed within the pan in contact with the oil and the movement of air through the tubular members conducts away the heat which otherwise builds up in the oil.

8 Claims, 5 Drawing Figures

PATENTED FEB 19 1974　　3,792,727

3,792,727

AUTOMOTIVE OIL COOLER

The present invention is generally concerned with cooling systems for automotive vehicles and more particularly with a new and improved oil pan for transmissions having self-contained means for cooling the oil retained in the pan.

In most automotive vehicles having automatic transmissions, there is an oil pan beneath the transmission and another oil pan beneath the engine block. An oil pan made in accordance with the present invention, depending on its physical configuration, could be used on the engine block or on the transmission but for purposes of the present disclosure and to illustrate the advantages of the oil pan, it will be described in connection with an automobile transmission.

As is well known to those skilled in the art, the transmission oil in an automatic transmission is used to transmit power from the torque converter to other working parts of the transmission. The other working parts of the transmission channel the power through the different gear ranges and through the drive shaft to the differential. The oil works under pressure so that considerable heat is generated. The heat must be dispersed to protect the working parts of the transmission; and in most modern cars and trucks, the oil is pumped by the transmission through steel lines into a separate tube of the radiator, where some of the heat is usually absorbed by the engine coolant in an adjoining section of the radiator. With this arrangement, it is easy to see that in some cases transmission overheating can contribute considerably to engine over-heating. This occurrence has brought about the need for a separate cooler for transmission oil. Usually the separate transmission oil cooler is in the form of a cooler unit through which the oil is pumped so that the temperature of the oil is reduced before it is returned to the transmission. One obvious disadvantage of such a system is that a separate and additional unit must be incorporated into the automotive power system.

A means I had previously adopted to cool transmission oil was to cut an opening in the bottom of the transmission pan and attach a smaller auxiliary pan to the existing pan so as to enclose the opening. The smaller auxiliary pan was provided with superimposed rows of tubular members which passed through opposed sides of the pan whereby air passing across or through the tubes, as a result of movement of the automobile, would have a cooling effect on the oil in the auxiliary pan. The effectiveness of this arrangement was limited, however, because circulation of the oil was restricted due to the dual chambered pan and because the superimposed rows of tubular members covered a substantial vertical cross-section of the auxiliary pan so that the oil was not free to circulate properly through the pan. Another disadvantage with the use of the auxiliary pan is that the high labor expense involved in cutting an opening in the existing pan and adapting the auxiliary pan to attach to the existing pan is excessive.

The oil cooler of the present invention comprises an oil pan which is adapted to replace the oil pan currently used as a transmission oil pan so that no additional components need to be incorporated into the power system of the vehicle. While the new and improved oil pan may be used with the presently utilized radiator cooler system, it can also be used alone and when so used is effective to lower the oil temperature on the order of one-third to one-half its normal operating temperature. The oil pan has a self-contained system for cooling the oil in the pan and the efficiency is such that the need for the currently used radiator cooling system or for an add-on cooler unit is obviated.

The oil pan includes a receptacle defined by a common open chamber having an open top with means to attach the pan to an automatic transmission and substantially straight walls extending downwardly from the top to the bottom of the pan. A plurality of horizontally spaced tubular members pass through the walls of the pan so as to be exposed to oil in the pan. The tubes have open ends disposed exteriorly of the pan so that movement of the vehicle effects air movement through the tubes to thereby conduct away heat which otherwise builds up in the oil in the pan.

Accordingly, it is an object of the present invention to provide a new and improved device for cooling the oil used by automotive vehicles.

It is another object of the present invention to provide a new and improved system for air cooling oil used by automotive vehicles.

It is another object to provide an oil pan for use with an automotive vehicle which has a self-contained system for cooling the oil retained therein.

It is still another object of the present invention to provide an oil pan for an automotive vehicle having a single row of heat conducting tubular members received therein such that ambient air passing through the tubular members will conduct away free heat which otherwise would build up in the oil in the pan.

Other objects, advantages and capabilities of the present invention will become more apparent as the description proceeds taken in conjunction with the accompanying drawings, in which.

Figure 1:
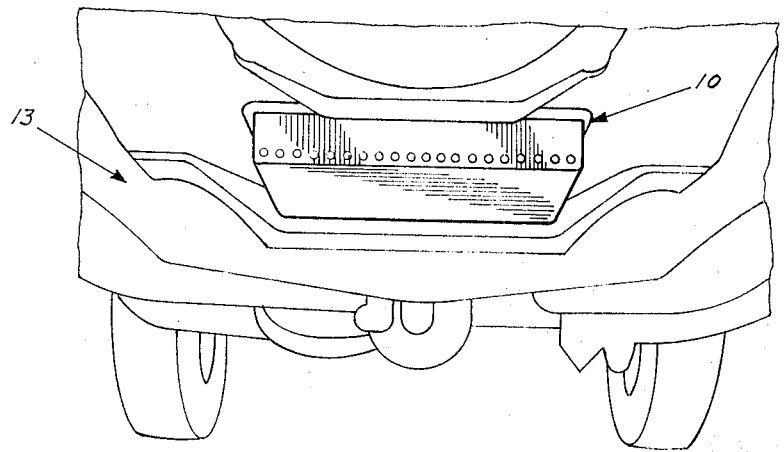
FIG. 1 is a perspective view of the underside of an automotive vehicle having the oil pan of the present invention attached to the automatic transmission.
Figure 2:
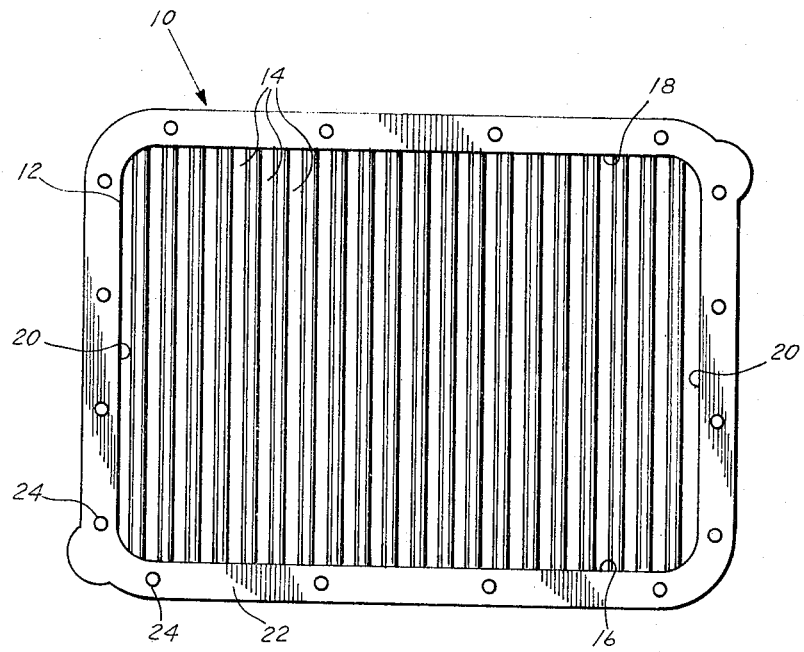
FIG. 2 is a plan view of the oil pan shown in FIG. 1 when removed from the vehicle.

The oil cooler 10 of the present invention takes the form of a pan or receptacle 12 similar to the conventional oil pan found on the engine of a car or truck or the pan found on the transmission of a vehicle having an automatic transmission. To simplify the description of the pan 12, it will be described in connection with the transmission 13 of a vehicle, it being understood that the pan would be equally useful with the engine of a vehicle only making minor changes in the size and/or shape of the pan.

The oil pan 12 is relatively deep compared to conventional oil pans and is a single chambered unit having a bottom 14, a relatively straight front wall 16, a rear wall 18 and side walls 20 which in the form illustrated lie substantially normal to each other and to the bottom of the pan. The pan is open at the top and has a flat continuous upper flange 22 protruding outwardly from the side, front and rear walls of the pan. The flange 22 is provided with a plurality of openings 24 therethrough which align with threaded holes (not shown) in the transmission of the vehicle whereby bolts or metal screws can be passed through the openings 24 and threaded into the transmission to secure the oil pan to the transmission.

Figure 3:
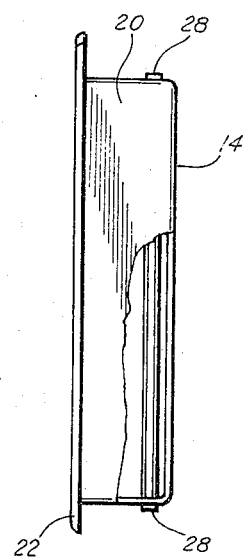
FIG. 3 is a side view of the pan shown in FIG. 2 with parts broken away to show the tubular members extending through the pan.
Figure 4:
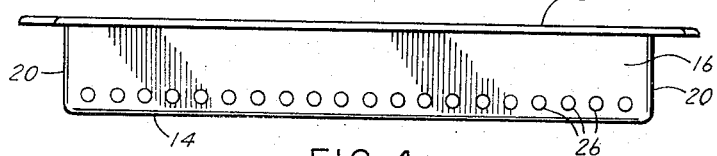
FIG. 4 is a front end view of the pan of FIG. 1 showing the open ends of the tubular members passing through the pan.
Figure 5:
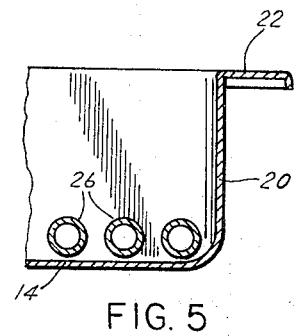
FIG. 5 is an enlarged fragmentary section of the pan taken transversely of the tubes extending therethrough.

The oil pan 12 is intended to replace the oil pan conventionally found on automatic transmissions and is very similar in construction to the conventional oil pans except that it is slightly deeper and has a plurality of tubular members 26 with open ends 28 which extend in a single row through the pan. It can be seen in FIG. 3 that the tubular members extend forwardly of the front wall 16 and rearwardly of the rear wall 18 for a short distance. In the disclosed embodiment of the pan, the tubular members 26 are of circular cross-section and while the tubular members can pass through the pan from side to side, it is preferred that they extend through the front and rear walls 16 and 18 respectively of the pan for the most efficient flow of air through the tubular members under normal operating conditions of the vehicle. The tubular members are preferably composed of a material with a high heat transfer capability such as copper, zinc, brass, aluminum or tin, however, other metallic materials could also be used to give the desired result with slightly less efficiency. A large number of the tubular members, approximately sixteen to thirty for a normal car transmission pan, are preferable to get a large ratio of surface area of the tubular members to the volume occupied by the members in the oil pan. The tubular members 26 are spaced a small distance from the bottom of the pan and occupy a substantial cross-sectional area of the pan so that in normal operation they will be completely surrounded by oil retained in the pan. The temperature of the tubular members tends to fluctuate with the oil retained in the pan but the passage of air through the tubes and across the ends of the tubes as is caused by the movement of the vehicle creates a heat transfer effect whereby the air passing through the tubes conducts away free heat which otherwise would build up in the oil in the pan.

With the above-described arrangement of the cooling unit, the oil in the pan is allowed to circulate as usual within a single chamber but is exposed to the cooling tubular members so that the temperature of the oil is reduced below that which it would normally have with no cooling system. One observed advantage with this arrangement is that the oil exposed to the tubular members is directly exposed to the working parts of the transmission so that the cooled oil does not need to pass through an intermediate chamber before being reused by the transmission. Experiments have shown that reductions in oil temperature in the range of one-third to one-half the normal operating temperature of the oil can be obtained when three-eighths inch O.D. and one-fourth inch I.D. copper tubular members are passed through the front and rear walls of the oil pan which is one-half inch deeper than the normally used pan and there are 16 to 30 of the tubular members passing through the pan and spaced approximately one-fourth inch from the bottom of the pan. The tubular members preferably extend outwardly from the front and rear walls of the pan approximately one inch. It will be appreciated with proper designing of the pan in regard to the ratio of the depth of the pan to the volume within the pan occupied by the tubular member that the effective volume of the pan can be identical to the volume of the normally used oil pan.

Although the present invention has been described with a certain degree of particularity, it is understood that the present disclosure has been made by way of example and that changes in details of structure may be made without departing from the spirit thereof.

What is claimed is:

1. An oil cooler for automotive vehicles comprising in combination a single chambered receptacle for retaining oil, a plurality of heat-conductive cylindrical members passing through the receptacle in horizontally spaced relation to one another so as to be exposed to a supply of oil retained in the receptacle, said tubular members having opposite ends extending outwardly beyond the walls of the receptacle in communication with the ambient environment exteriorly of the receptacle such that upon movement of the vehicle air passing across and through the cylindrical members will transfer heat from said cylindrical members to create a cooling effect on the oil in the receptacle exposed to the tubular member.

2. An oil pan for attachment to the transmission of an automotive vehicle comprising a receptacle defined by a common open chamber having an open top, substantially straight walls extending downwardly from the top, attachment means at the top for attachment of the receptacle to the transmission, at least one row of tubular members passing through the receptacle in horizontally spaced, parallel relation to one another so as to be exposed to oil in the receptacle, said tubular members extending outwardly beyond said walls of the receptacle and having open ends in communication with the ambient environment exteriorly of the receptacle such that movement of the vehicle will cause air passing across the outward extension of the tubular members and through the tubular members to create a cooling effect on the oil in the receptacle exposed to the tubular members.

3. The oil pan of claim 2 wherein said tubular members cover a substantial portion of a horizontal cross-section of the pan when the pan is attached to an automotive vehicle.

4. The oil pan of claim 3 wherein said attachment means include a flanged surface adjacent the open top of the receptacle, said flanged surface having openings therethrough for the reception of fastening means to attach the receptacle to the oil-using component of the vehicle.

5. The oil pan of claim 2 wherein said receptacle has substantially straight side and bottom walls normal to one another to form a common chamber.

6. The oil pan of claim 3 wherein said tubular members are of a metallic material having a high heat transfer capability.

7. The oil pan of claim 5 wherein said tubular members are made of materials selected from the group consisting of copper, brass, zinc, aluminum or tin.

8. The oil pan of claim 2 wherein said tubular rods are made of copper and have a three-eighths inch O.D. and a one-fourth inch I.D.

* * * * *